United States Patent
Sakaguchi et al.

(10) Patent No.: US 8,670,913 B2
(45) Date of Patent: Mar. 11, 2014

(54) ACCELERATOR PEDAL FORCE CONTROL DEVICE

(75) Inventors: Shigeyuki Sakaguchi, Yokohama (JP); Masao Shiomi, Sagamihara (JP); Masahiro Omori, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/578,882

(22) PCT Filed: Jan. 13, 2011

(86) PCT No.: PCT/JP2011/050438
§ 371 (c)(1),
(2), (4) Date: Aug. 14, 2012

(87) PCT Pub. No.: WO2011/105125
PCT Pub. Date: Sep. 1, 2011

(65) Prior Publication Data
US 2012/0304800 A1    Dec. 6, 2012

(30) Foreign Application Priority Data
Feb. 24, 2010   (JP) ................................. 2010-038187

(51) Int. Cl.
*B60K 26/02* (2006.01)
(52) U.S. Cl.
USPC .................................. 701/70; 701/36; 74/513
(58) Field of Classification Search
USPC ........................... 701/36, 70; 74/513; 123/399
See application file for complete search history.

(56) References Cited

U.S. PATENT DOCUMENTS

| | | | |
|---|---|---|---|
| 7,006,917 B2 * | 2/2006 | Hijikata | 701/301 |
| 2005/0056253 A1 * | 3/2005 | Yone et al. | 123/399 |
| 2010/0204883 A1 * | 8/2010 | Honda | 701/36 |

FOREIGN PATENT DOCUMENTS

| | | |
|---|---|---|
| EP | 1 749 724 A2 | 2/2007 |
| JP | 2005-132225 A | 5/2005 |
| JP | 2005132225 A * | 5/2005 |
| JP | 2007-76468 A | 3/2007 |
| JP | 2009-41544 A | 2/2009 |
| JP | 2010-000918 A | 1/2010 |
| JP | 2010000918 A * | 1/2010 |
| WO | WO 2005/084993 A1 | 9/2005 |
| WO | WO 2010/013125 A1 | 2/2010 |

OTHER PUBLICATIONS

Supplementary European Search Report dated Nov. 29, 2013; (5 pgs.).

* cited by examiner

*Primary Examiner* — Helal A Algahaim
*Assistant Examiner* — Charles J Han
(74) *Attorney, Agent, or Firm* — Foley & Lardner LLP

(57) ABSTRACT

When an accelerator opening exceeds an opening threshold value, a base pedaling force of an accelerator pedal is increased. An increment to a pedaling force is changed in accordance with the accelerator opening in a manner to make the pedaling force approach a characteristic that the pedaling force increases at a constant rate with respect to increase of the accelerator opening. For example, when a mechanism is employed which has a convex-up characteristic wherein the rate of increase of base pedaling force decreases as the accelerator opening increases, the increment is set to increase as the accelerator opening increases. Conversely, when a mechanism is employed which has a convex-down characteristic wherein the rate of base pedaling force increases as the accelerator opening increases, the increment is set to decrease as the accelerator opening increases.

3 Claims, 5 Drawing Sheets

FIG.3A FIG.3B
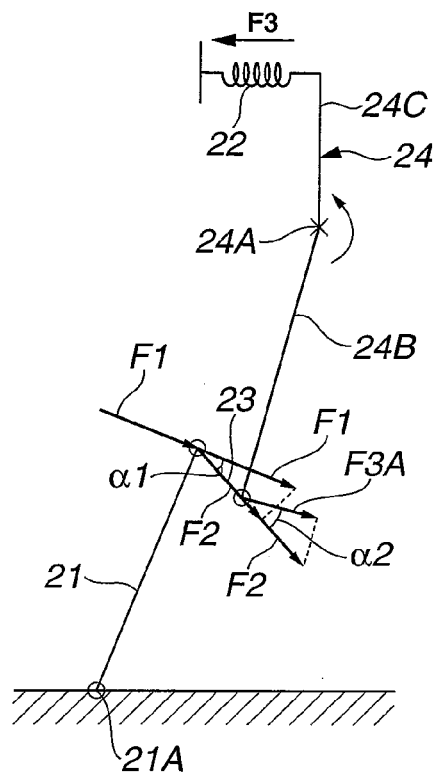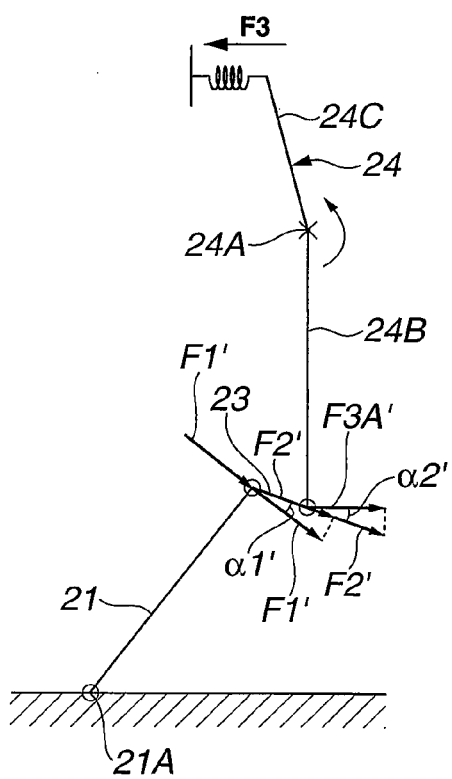
FIG.4
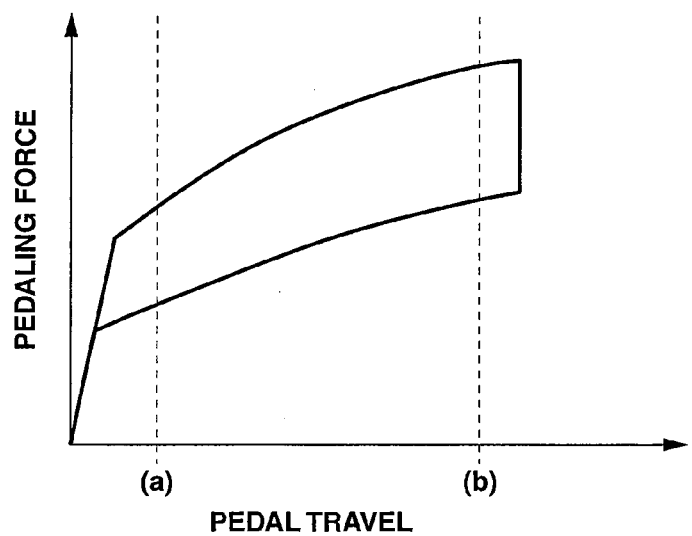

ACCELERATOR PEDAL FORCE CONTROL DEVICE

TECHNICAL FIELD

The present invention relates to an accelerator pedal force control device that controls a pedal reaction force (pedaling force) of an accelerator pedal of a vehicle.

BACKGROUND ART

In recent years, in order to enhance the fuel efficiency of a vehicle, a technique has been proposed by which, for example, when a driver depresses an accelerator pedal more than necessary, a specific increment of pedaling force is intentionally added to a base pedal reaction force (base pedaling force) of the accelerator pedal, so as to produce a suitable feel of barrier to the driver who is operating the accelerator pedal, and guide the driver to an operation region which is good in fuel efficiency. For example, a patent document 1 discloses a technique of: calculating an optimal amount of operation (optimal amount of depression) of an accelerator pedal based on a driving condition of a vehicle wherein the optimal amount achieves an optimal fuel consumption rate; and correcting the calculated optimal amount of operation depending on the form of a preceding road in which the vehicle is to run; and increasing the pedal reaction force (pedaling force) of the accelerator pedal in a stepwise manner in the neighborhood of the corrected optimal amount of operation, when the driver depresses the accelerator pedal. In patent document 1, the optimal amount of operation is corrected to a smaller value, when the preceding road in which the vehicle is to run is a downhill or curved road.

PRIOR ART DOCUMENT(S)

Patent Document(s)

Patent Document 1: JP 2007-076468 A

SUMMARY OF THE INVENTION

Problem(s) to be Solved by the Invention

There is a mechanism for setting a base pedaling force for an accelerator pedal, wherein the mechanism structurally has a characteristic that the base pedaling force is not completely proportional to the amount of operation of the accelerator pedal, but increases at a rate of increase with respect to increase of accelerator opening, wherein the rate of increase increases or decreases with increase of accelerator opening. In cases where such a mechanism is employed, there has been found the following problem in situations in which after the pedaling force is increased by addition of a predetermined increment to the base pedaling force so as to produce a suitable feel of barrier to a driver, the driver further depresses the accelerator pedal.

Namely, the characteristic that the rate of increase of the base pedaling force decreases may cause the driver to feel as if the total pedaling force ([base pedaling force]+[pedaling force increment]) decreases as the accelerator pedal is being depressed, and thereby fail to continue to provide the driver with a suitable feel of barrier. For example, this may cause the driver to excessively depress the accelerator pedal even when under a condition of bad fuel efficiency. Conversely, the characteristic that the rate of increase of the base pedaling force increases may cause the driver to feel as if the pedaling force becomes excessively large, which is not preferable. In summary, such a pedaling force control device has a basic characteristic that the accelerator pedal force is increased rapidly during driver's operation for acceleration. Accordingly, for example, in situations in which a required driving force for acceleration of the vehicle is relatively large, it is likely that the vehicle cannot be accelerated as intended by the driver, failing to satisfy the driver. Also, there is a possibility that the driver recognizes incorrectly that the vehicle is not good in accelerating performance.

Means for Solving the Problem(s)

In view of the foregoing, even in cases where the structure has a characteristic that the base pedaling force is not completely proportional to the amount of operation of the accelerator pedal, but increases at a rate of increase with respect to increase of accelerator opening wherein the rate of increase increases or decreases with increase of accelerator opening, the present invention serves to provide a suitable increment of pedaling force, and thereby provide a driver with information relating to fuel efficiency, and allow to make full use of an operation region in which fuel efficiency is good.

Specifically, according to the present invention, an accelerator pedal force control device comprises: a base pedaling force setting means that sets a base pedaling force of an accelerator pedal of a vehicle in a manner that the base pedaling force increases with an increase of accelerator opening, wherein the accelerator opening is changed by operation of the accelerator pedal; an accelerator opening sensing section (accelerator opening sensing means) that senses the accelerator opening; and a pedaling force increasing section (pedaling force increasing means) that sets a pedaling force by adding an increment to the base pedaling force; wherein the pedaling force increasing section changes the increment in accordance with the accelerator opening in a manner to make the pedaling force approach a characteristic that the pedaling force increases at a constant rate with respect to increase of the accelerator opening.

For example, in cases where the mechanism for setting the base pedaling force has a characteristic that the base pedaling force increases at a rate of increase with respect to increase of the accelerator opening, wherein the rate of increase decreases with increase of the accelerator opening, the increment of pedaling force may be set in a manner that the increment increases with increase of the accelerator opening. Conversely, in cases where the mechanism for setting the base pedaling force has a characteristic that the base pedaling force increases at a rate of increase with respect to increase of the accelerator opening, wherein the rate of increase increases with increase of the accelerator opening, the increment of pedaling force may be set in a manner that the increment decreases with increase of the accelerator opening.

Typically, the accelerator pedal force control device further comprises: an opening threshold value setting section (opening threshold value setting means) that sets an opening threshold value based on a state of operation of the vehicle, wherein the opening threshold value relates to fuel efficiency; and an evaluating section (evaluating means) that evaluates whether the accelerator opening is greater than the opening threshold value; wherein the pedaling force increasing section performs the addition of the increment in response to a condition that the evaluating section has evaluated that the accelerator opening is greater than the opening threshold value.

Effect(s) of the Invention

Even in cases where the structure has a characteristic that the base pedaling force is not proportional to the amount of operation of the accelerator pedal, the present invention serves to make the rate of increase of the total pedaling force approach a constant value by changing the pedaling force increment with increase of the accelerator opening, and thereby provide a suitable increment of pedaling force even when the driver further depresses the accelerator pedal after the increase of pedaling force, and thereby provide the driver with accurate information relating to fuel efficiency, and allow to make full use of an operation region in which fuel efficiency is good.

BRIEF DESCRIPTION OF THE DRAWINGS

FIG. 3 is a diagram schematically showing a mechanism according to a first embodiment of the present invention, wherein a base pedaling force of an accelerator pedal has a convex-up characteristic.

FIG. 4 is a diagram showing characteristics of the base pedaling force in the first embodiment.

FIG. 5 is a diagram showing how the base pedaling force according to the first embodiment increases, wherein

FIG. 8 is a diagram showing how the base pedaling force according to the second embodiment increases, wherein

MODE(S) FOR CARRYING OUT THE INVENTION

Figure 1:
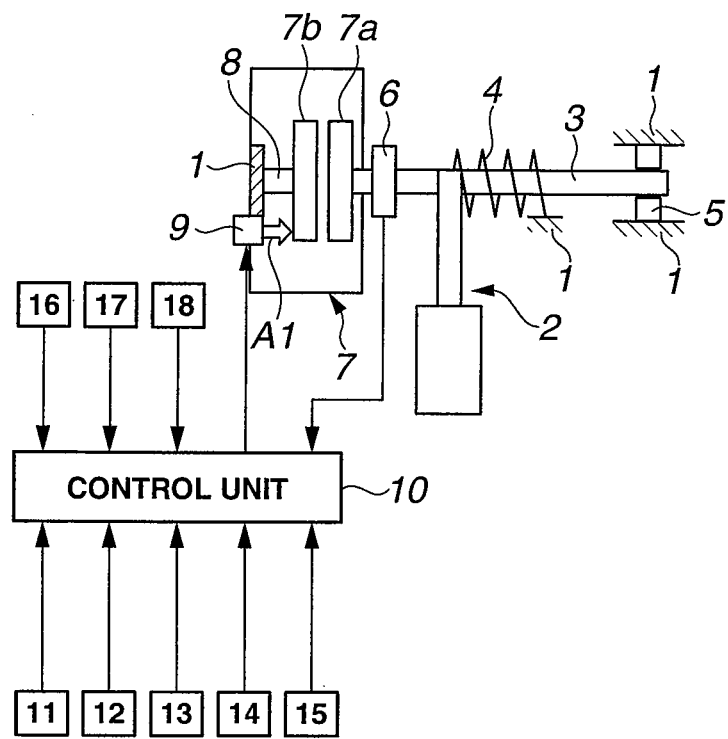
FIG. 1 is a diagram schematically showing a system configuration of an accelerator pedal force control device according to the present invention while schematically showing a pedaling force changing mechanism.
Figure 2:
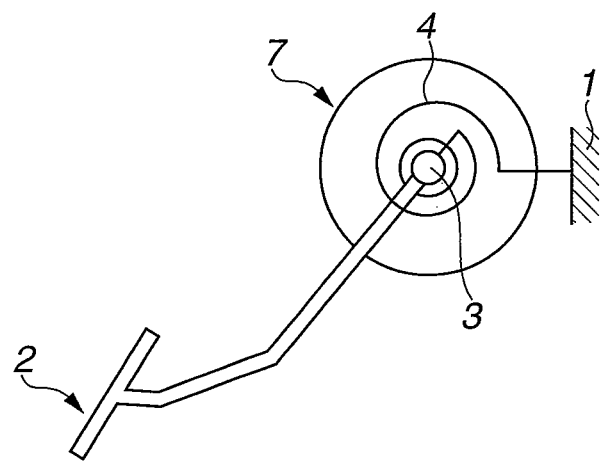
FIG. 2 is a diagram schematically showing the pedaling force changing mechanism.

The following describes in detail preferable modes for carrying out the present invention with reference to the drawings. FIGS. 1 and 2 schematically show an example of configuration of an entire device. Mechanisms for setting a base pedaling force according to first and second embodiments are described below with reference to FIGS. 3 and 6.

Basically, this accelerator pedal force control device controls a variable pedaling force (pedal reaction force) of an accelerator pedal 2 that is mounted to a body 1 of a vehicle not shown. As described below, the accelerator pedal force control device is provided with a means for sensing the opening (amount of depression) of accelerator pedal 2 wherein the means is mounted on the vehicle, and a means for changing the pedaling force of accelerator pedal 2 from the base pedaling force. The accelerator pedal force control device sets the pedaling force of accelerator pedal 2 by adding an increment to the base pedaling force, in a region where the opening of accelerator pedal 2 is greater than a predetermined accelerator opening threshold value.

As shown in FIGS. 1 and 2, accelerator pedal 2 is mounted to a rotary shaft 3 and configured to swing about rotary shaft 3 as a fulcrum. Accelerator pedal 2 is applied with a reaction force by a return spring 4 of any type in an accelerator-closing direction, wherein return spring 4 is fixed at one end to vehicle body 1 and fixed at the other end to rotary shaft 3. One end of rotary shaft 3 is rotatably supported by vehicle body 1 through a bearing 5, whereas a accelerator position sensor 6 as an example of accelerator opening sensing section (accelerator opening sensing means) is provided close to the other end of rotary shaft 3.

In this embodiment, the amount of depression of accelerator pedal 2 (accelerator opening) and the opening of a throttle valve not shown of an internal combustion engine not shown are associated with each other in a manner that the throttle valve opening of the internal combustion engine increases according to the amount of depression of accelerator pedal 2. Namely, the quantity of fuel injection (and the quantity of fuel consumption accordingly) increases according to the accelerator opening.

The pedaling force changing mechanism includes a variable friction plate 7 which includes a pair of friction members 7a, 7b which are opposed to each other and apply a frictional force against rotation of rotary shaft 3. One friction member 7a is coupled mechanically to one end of rotary shaft 3, whereas the other friction member 7b is supported by a stationary shaft 8 through a spline or the like, wherein no axial movement and no rotation of friction member 7b with respect to stationary shaft 8 is allowed. Stationary shaft 8 is fixed to and supported by vehicle body 1. An actuator 9 (for example, an electromagnetic solenoid) is fixed to vehicle body 1 and urges the friction member 7b toward the friction member 7a.

The variable friction plate 7 moves the friction member 7b in the axial direction (in the direction of arrow A1 in FIG. 1) by being operated by actuator 9, and thereby controls a variable frictional force between friction member 7a and friction member 7b. The operation of actuator 9 is controlled by a control unit 10. The control of operation of actuator 9 by control unit 10 allows to change the frictional force applied to rotary shaft 3 and thereby change the pedaling force of accelerator pedal 2 when accelerator pedal 2 is depressed.

The control unit 10 receives input of signals from various sensors which include the accelerator position sensor 6 for sensing the opening of accelerator pedal 2, an acceleration sensor 11 for sensing the gradient of a road based on the inclination of the vehicle, an atmospheric pressure sensor 12 for sensing the atmospheric pressure in the surroundings, an intake air temperature sensor 13 for sensing the temperature of intake air, a vehicle speed sensor 14 for sensing vehicle speed, a seat pressure sensor 15 mounted in a seat not shown of the vehicle for detecting whether or not there is a passenger is in the vehicle, and a gear position sensor 16 for sensing the gear ratio of a transmission. Moreover, control unit 10 receives input of information from a car navigation system 17 which can obtain the current position of the vehicle and map information about the neighborhood of the current position of the vehicle, and receives input of a signal from a laser radar 18 which senses an inter-vehicle distance between the host vehicle and a forward vehicle.

The transmission may be an infinitely variable transmission which changes the transmission gear ratio continuously, or may be an automatic transmission based on combination of a step-variable auxiliary speed change mechanism and a torque converter, or may be a manual transmission. In cases of infinitely variable transmission, the transmission gear ratio can be obtained as a ratio in rotational speed between an input shaft side and an output shaft side.

FIG. 3 schematically shows a mechanism for setting a base pedaling force (base pedaling force setting section) according to a first embodiment, wherein the base pedaling force has a characteristic that the rate of increase of the base pedaling force decreases with increase of the accelerator opening. FIG. 3A shows a situation where the pedal travel is small, whereas FIG. 3B shows a situation where the pedal travel is large. This mechanism has a structure that a pad 21 and a spring 22 are linked by a first link 23 and a second link 24, wherein pad 21 is of accelerator pedal 2 (see FIG. 2) and swings about a fulcrum 21A, and spring 22 applies to pad 21 a spring reaction force equivalent to the base pedaling force. First link 23 is linked at one end with pad 21, and linked at the other end with second link 24. First link 23 and pad 21 are linked with each other for swinging with respect to each other, whereas first link 23 and second link 24 are linked with each other for swinging with respect to each other. Second link 24 is attached to the vehicle body side for rotation about a fulcrum 24A. Second link 24 is linked with first link 23 at a tip of a first arm 24B which extends in one direction from fulcrum 24A, whereas second link 24 is connected to spring 22 at a tip of a second arm 24C which extends in the other direction from fulcrum 24A.

According to the configuration described above, when a driver depresses pad 21 by a specific operating force F1 (F1'), first link 23 presses second link 24 by a component force F2 in the longitudinal direction of first link 23, and component force F2 acts in the form of a component force F3A in the direction perpendicular to the first arm of second link 24, wherein component force F3A acts on second link 24 in a rotational direction. The torque resulting from component force F3A ([length of first arm 24B]×F3A) is brought into balance with a torque resulting from a spring force F3 of spring 22 ([length of second arm 24C]×[a component of F3 perpendicular to second arm 24C]).

The angle α1 between F1 and F2 and the angle α2 between F2 and F3A vary according to the amount of operation or amount of depression of the accelerator pedal by the driver (also referred to as pedal travel or accelerator opening), namely, according to the angle of inclination of accelerator pedal 2, so that a required operating force F1 of the driver varies in balance with the same reaction force F3 of spring 22. Incidentally, for ease of understanding, the following explanation is based on the assumption that the spring reaction force F3 is constant regardless of the amount of operation of the accelerator pedal, although the spring reaction force F3 actually increases with increase of the pedaling force.

In the first embodiment, as the pedal travel of pad 21 increases, the angle α1' and angle α2' become smaller (α1'<α1, α2'<α2) so that the ratios of component force F2' and component force F3A' to operating force F1' become larger, and thereby the required component force F3A' finally in balance with the spring force becomes smaller with respect to operating force F1'. Accordingly, the required operating force F1' becomes smaller in balance with the reaction force F3 of spring 22 (F1>F1'). As a result, as shown in FIG. 4, the base pedaling force does not increase completely in proportion to increase of pedal travel of the accelerator pedal (accelerator opening), but increases with increase of the accelerator opening with a characteristic that the rate of increase of the pedaling force decreases with increase of the accelerator opening, i.e. the so called convex-up characteristic. FIG. 4 schematically shows the characteristic of accelerator pedal force that the basic pedaling force or base pedaling force increases according to accelerator opening with a suitable hysteresis between the increasing direction of the accelerator opening and the decreasing direction of the accelerator opening.

Figure 5A:
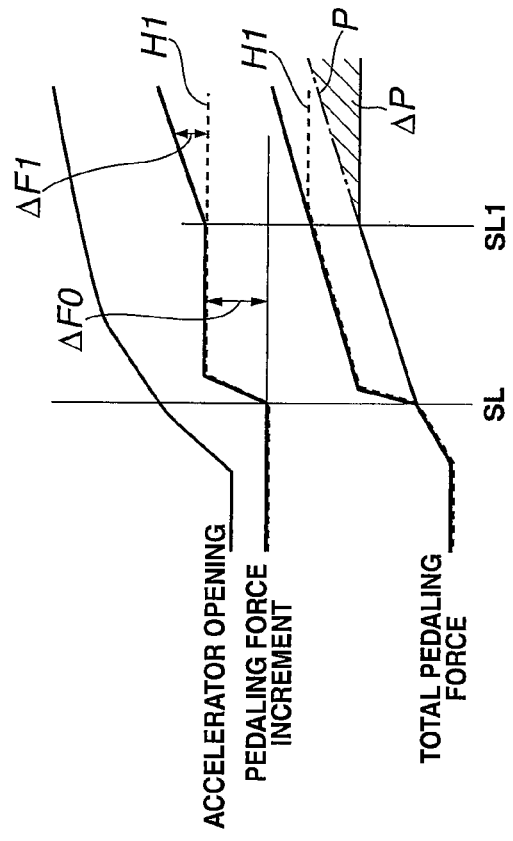
FIG. 5A is a characteristic diagram and FIG. 5B is a timing chart.

As shown in FIG. 5, when the accelerator opening exceeds a predetermined accelerator opening threshold value SL during operation in the increasing direction of the accelerator opening, namely, during depression, then the accelerator pedal force is set by adding a step increment to the base pedaling force. The stepwise increase of the accelerator pedal force serves to provide a suitable feel of barrier to a driver, and naturally suppress accelerator pedal 2 from being further depressed by the driver, and simultaneously reliably inform the driver of a shift from the operating state that the fuel consumption rate is low (the fuel efficiency is good) to the operating state that the fuel consumption rate is high (the fuel efficiency is bad). For example, the increase of the pedaling force of accelerator pedal 2 during increase of the accelerator opening may be cancelled immediately when the direction of operation of accelerator pedal 2 reverses into the direction to reduce the accelerator opening, or may be cancelled when the accelerator opening falls to be smaller than or equal to the predetermined opening.

In the present embodiment where the mechanism having the convex-up characteristic of the base pedaling force is employed to set the pedaling force by addition of the increment to the base pedaling force, the pedaling force is not set by addition of a flat increment ΔF0 as shown in a broken line H1 in FIG. 5, but is set by addition of an increment that increases with increase of the accelerator opening so that the total pedaling force after addition of increment ([base pedaling force]+[pedaling force increment]) approaches a characteristic of increasing at a constant rate of increase with respect to increase of the accelerator opening. Namely, as shown in FIG. 5, with respect to the flat increment ΔF0, an increment ΔF1 is added which increases in proportion to the accelerator opening.

For example, in a situation where the driver has further depressed the accelerator pedal after the pedaling force to the driver is increased, the characteristic described above serves to suppress the driver from feeling due to decrease of the rate of increase of the pedaling force as if the feel of barrier becomes lost, and continue to give a suitable constant feel of barrier, and thereby prevent the driver from unnecessarily depressing further the accelerator pedal while feeling as if the feel of barrier becomes lost, and from adversely affecting the fuel efficiency.

Figure 5B:
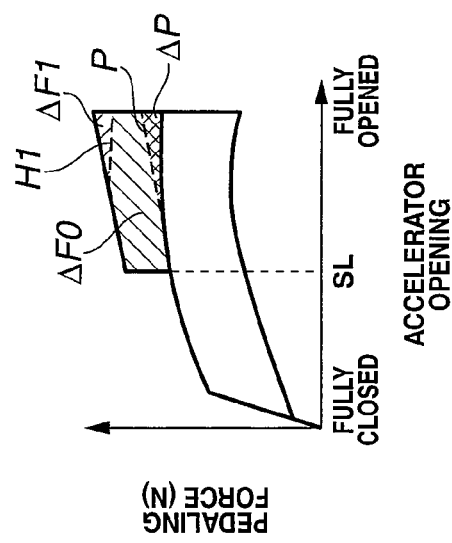

Incidentally, as shown in FIG. 5B, the mechanism according to this embodiment has a characteristic that the rate of increase of the base pedaling force starts to increase at a relatively large accelerator opening. Accordingly, when the accelerator opening reaches a specific value SL1 that is larger than the accelerator opening threshold value SL, the pedaling force increment starts to be increased with increase of the accelerator opening. However, the embodiment is not so limited but may be configured so that immediately after the accelerator opening threshold value SL is exceeded, the rate of increase of the pedaling force increment may be increased.

Figure 6A:
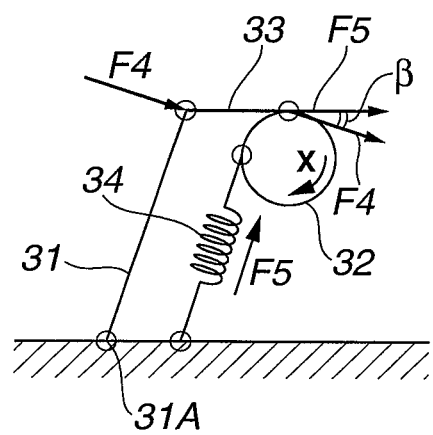
FIG. 6 is a diagram schematically showing a mechanism according to a second embodiment of the present invention, wherein a base pedaling force of an accelerator pedal has a convex-down characteristic.
Figure 6B:
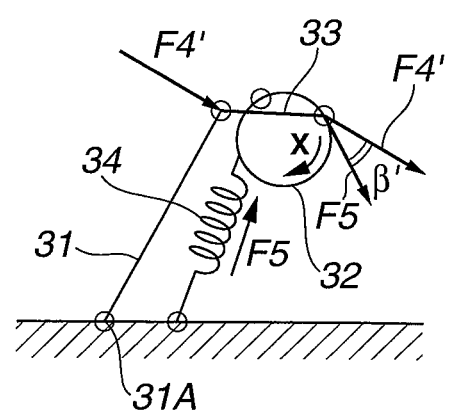

FIG. 6 schematically shows a mechanism for setting a base pedaling force (base pedaling force setting section) according to a second embodiment, wherein the base pedaling force has a characteristic that the rate of increase of the base pedaling force increases with increase of the accelerator opening. FIG. 6A shows a situation where the pedal travel is small, whereas FIG. 6B shows a situation where the pedal travel is large. This mechanism includes a pad 31 of accelerator pedal 2, a link 33, and a spring 34, wherein pad 31 swings about a fulcrum 31A, wherein link 33 links pad 31 and a pulley 32, and wherein spring 34 biases pulley 32 in a specific direction (opposite to a clockwise direction X in FIG. 6). The base pedaling force F4 is provided by a spring force F5 of spring 34. Pad 31 and link 33 are coupled in a manner that pad 31 and link 33 do not swing with respect to each other.

In the configuration described above, when the driver depresses accelerator pedal 2 by the specific operation force F4, the component force in the tangential direction of pulley 32 acts as a force F5 (F5<F4) that rotates pulley 32 in the specific direction X through link 33, wherein the force F5 is in balance with the spring force of spring 34.

Figure 7:
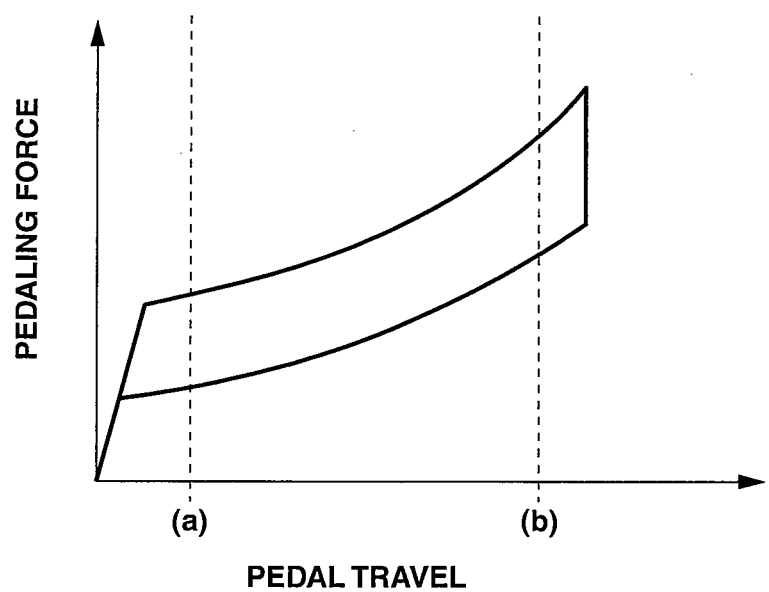
FIG. 7 is a diagram showing characteristics of the base pedaling force in the second embodiment.

The angle β between the direction of depression of accelerator pedal 2 and the tangential direction of pulley 32 varies according to the amount of depression (pedal travel), namely, the angle of inclination, of accelerator pedal 2, so that the operation force F4 of the driver required to take balance with the reaction force F5 of spring 34, namely, the base pedaling force, varies. In the second embodiment, as the pedal travel of pad 21 increases, the angle β increases to angle β', so that the base pedaling force F4' required to take balance with the same reaction force F5 of spring 34 increases (F4<F4'). As a result, as shown in FIG. 7, as the pedal travel of the accelerator pedal (accelerator opening) increases, the rate of increase of pedaling force increases, showing the so-called convex-down characteristic.

Figure 8B:
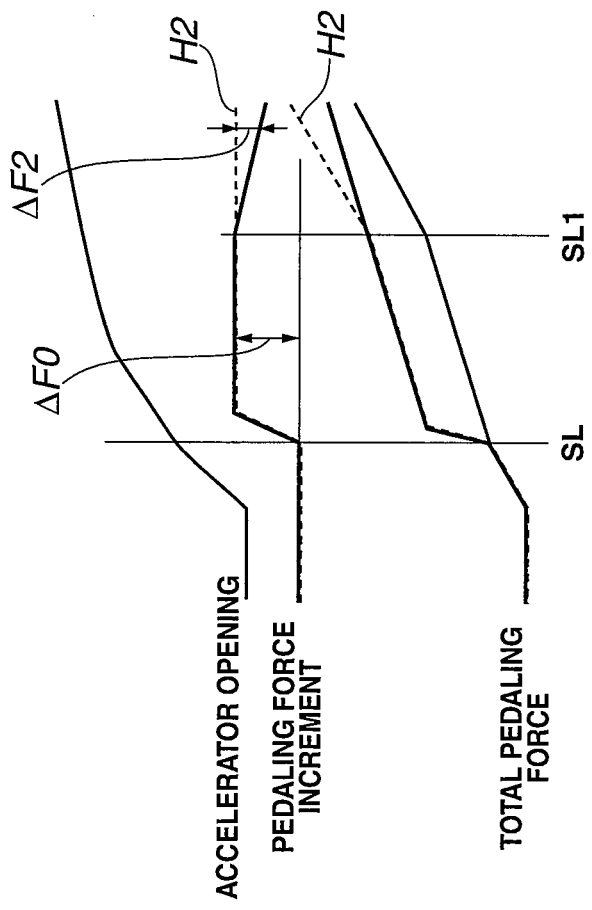
FIG. 8A is a characteristic diagram and FIG. 8B is a timing chart.
Figure 8A:
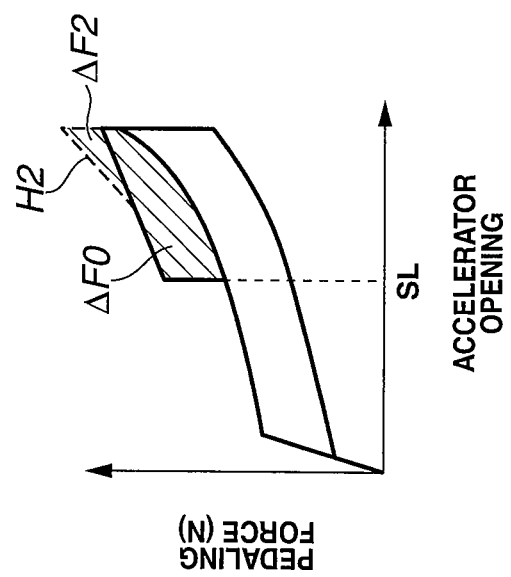

In the case described above where the mechanism having the convex-down characteristic of the base pedaling force is employed to set the pedaling force by addition of increment to the base pedaling force, the pedaling force is set by addition of an increment that decreases with increase of the accelerator opening so that the total pedaling force after addition of increment ([base pedaling force]+[pedaling force increment]) approaches a characteristic of increasing at a constant rate of increase with respect to increase of the accelerator opening. Namely, as shown in FIG. 8, with respect to the flat increment ΔF0, a decrement ΔF2 is added which decreases in proportion to the accelerator opening.

The characteristic described above serves to prevent the driver from feeling as if the pedaling force excessively increases, and allow the pedaling force to increase at a constant rate with increase of the accelerator opening, and thereby allow the driver to feel a suitable feel of barrier, and easily depresses the pedal further, and achieve an acceleration as intended by the driver.

In the embodiments described above, the pedaling force is controlled to be constant after the increase of the pedaling force of the accelerator pedal. However, in cases the mechanism having a convex-up characteristic as shown in FIG. 3 is employed, the pedaling force may be increased by a predetermined increment ΔP so that the pedaling force increases at a constant rate with respect to increase of the accelerator opening as shown by a long dashed short dashed line P in FIG. 5, even before addition of the increment of pedaling force, namely, even in situations where the increment of pedaling force is not yet added. In such cases, for example, in cases where the driver may be made to feel as if the pedaling force decreases according to depression of the accelerator pedal, and unnecessarily depress the accelerator pedal further, the pedaling force can be suitably increased to prevent the driver from further depressing the accelerator pedal. The accelerator pedal force control device according to the present invention is not limited only to a vehicle provided with an internal combustion engine as a single driving source, but may be applied to motor vehicles such as electric vehicles and hybrid electric vehicles.

The invention claimed is:

1. An accelerator pedal force control device comprising:
an accelerator opening sensing section that senses an accelerator opening; and
a control unit comprising
a base pedaling force setting section that sets a base pedaling force of an accelerator pedal of a vehicle in a manner that the base pedaling force increases with an increase of the accelerator opening, wherein the accelerator opening is changed by operation of the accelerator pedal; and
a pedaling force increasing section that sets a pedaling force by adding an increment to the base pedaling force;
wherein:
the base pedaling force setting section sets the base pedaling force in a manner that the base pedaling force increases at a rate of increase with respect to the increase of the accelerator opening, wherein the rate of increase decreases with the increase of the accelerator opening; and
the pedaling force increasing section changes the increment in accordance with the accelerator opening in a manner that the increment increases with the increase of the accelerator opening and in a manner to make the pedaling force approach a characteristic that the pedaling force increases at a constant rate with respect to the increase of the accelerator opening.

2. An accelerator pedal force control device comprising:
an accelerator opening sensing section that senses an accelerator opening; and
a control unit comprising
a base pedaling force setting section that sets a base pedaling force of an accelerator pedal of a vehicle in a manner that the base pedaling force increases with an increase of the accelerator opening, wherein the accelerator opening is changed by operation of the accelerator pedal;
a pedaling force increasing section that sets a pedaling force by adding an increment to the base pedaling force wherein the pedaling force increasing section changes the increment in accordance with the accelerator opening in a manner to make the pedaling force approach a characteristic that the pedaling force increases at a constant rate with respect to the increase of the accelerator opening;
an opening threshold value setting section that sets an opening threshold value based on a state of operation of the vehicle, wherein the opening threshold value relates to fuel efficiency; and
an evaluating section that evaluates whether the accelerator opening is greater than the opening threshold value;
wherein:
the pedaling force increasing section performs the addition of the increment when the accelerator opening is between the opening threshold value and a maximum value in response to a condition that the evaluating section has evaluated that the accelerator opening is greater than the opening threshold value;
the base pedaling force setting section sets the base pedaling force in a manner that the base pedaling force increases at a rate of increase with respect to the increase of the accelerator opening, wherein the rate of increase decreases with the increase of the accelerator opening; and
the pedaling force increasing section sets the increment in a manner that the increment increases with the increase of the accelerator opening.

3. An accelerator pedal force control device comprising:
an accelerator opening sensing section that senses an accelerator opening; and
a control unit comprising
a base pedaling force setting section that sets a base pedaling force of an accelerator pedal of a vehicle in a manner that the base pedaling force increases with an increase of the accelerator opening, wherein the accelerator opening is changed by operation of the accelerator pedal;

a pedaling force increasing section that sets a pedaling force by adding an increment to the base pedaling force, wherein the pedaling force increasing section changes the increment in accordance with the accelerator opening in a manner to make the pedaling force approach a characteristic that the pedaling force increases at a constant rate with respect to the increase of the accelerator opening;

an opening threshold value setting section that sets an opening threshold value based on a state of operation of the vehicle, wherein the opening threshold value relates to fuel efficiency; and an evaluating section that evaluates whether the accelerator opening is greater than the opening threshold value;

wherein:

the pedaling force increasing section performs the addition of the increment when the accelerator opening is between the opening threshold value and a maximum value in response to a condition that the evaluating section has evaluated that the accelerator opening is greater than the opening threshold value;

the base pedaling force setting section sets the base pedaling force in a manner that the base pedaling force increases at a rate of increase with respect to the increase of the accelerator opening, wherein the rate of increase increases with the increase of the accelerator opening; and the pedaling force increasing section sets the increment in a manner that the increment decreases with the increase of the accelerator opening.

* * * * *